UNITED STATES PATENT OFFICE.

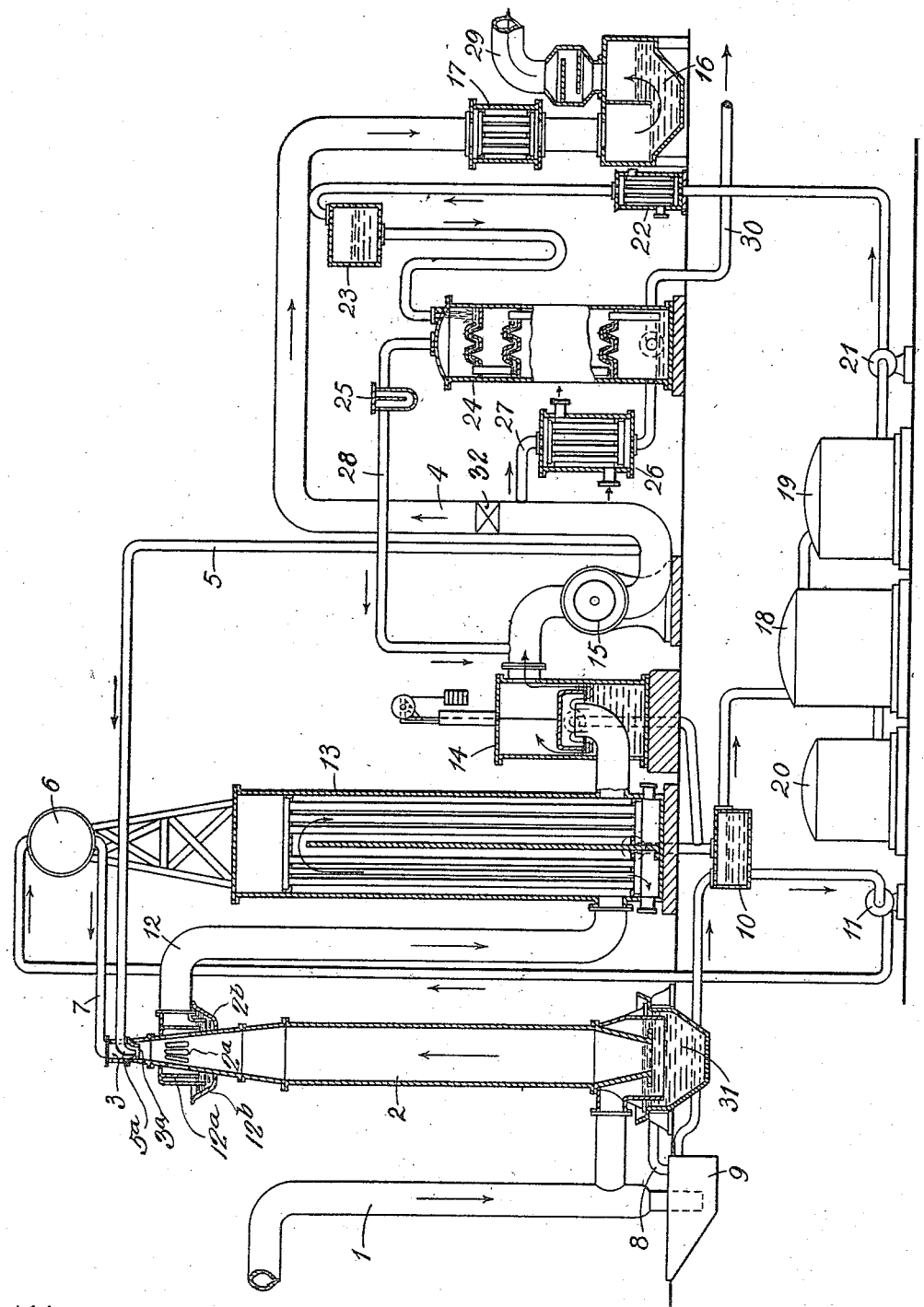
N. SCHUSTER.
PROCESS OF EXTRACTING AMMONIA FROM AMMONIACAL LIQUOR.
APPLICATION FILED MAR. 15, 1915.
1,244,903.
Patented Oct. 30, 1917.
Witnesses:
Aug. Danielsson
John Hans.
Inventor:
N. Schuster

NICHOLAS SCHUSTER, OF LONDON, ENGLAND, ASSIGNOR TO BRITISH COKE OVENS LIMITED, OF LONDON, ENGLAND.

PROCESS OF EXTRACTING AMMONIA FROM AMMONIACAL LIQUOR.

1,244,903.

Specification of Letters Patent.   Patented Oct. 30, 1917.

Application filed March 15, 1915.  Serial No. 14,584.

*To all whom it may concern:*

Be it known that I, NICHOLAS SCHUSTER, a subject of the Emperor of Germany, residing at 7 Princes street, Westminster, London, S. W., have invented Processes for Extracting Ammonia from Ammoniacal Liquor, of which the following is a specification.

Ammoniacal liquor obtained during the purification of coal gas and the like, is subjected to various processes for the extraction therefrom of the ammonia. As an extracting agent steam is usually employed; but it is customary also to employ gas which is freed from heavy hydrocarbons and reheated and then passed through the ammonia liquor in a still, the ammonia-laden gas being subsequently conducted to a saturater in which the ammonia is precipitated. The employment of gas instead of steam has the advantage that the re-heating of the former can be effected at a much less expenditure of heat than is required for the production of the steam.

The present invention relates to a process in which the ammoniacal liquor is subjected to treatment with re-heated gas for the extraction of the ammonia, and it consists in leading the necessary volume of gas from the gas main through a superheater to the ammonia still, the ammonia-laden gas being subsequently returned to the main by which it is conducted, together with the main bulk of gas to the saturater.

This process has the advantage that a rich yield of ammonia is obtained at a very low cost of production.

In the accompanying drawing the invention is illustrated by a diagrammatic view of the plant employed in the process.

The hot crude gases from the coke ovens enter the recovery plant by way of a main 1 which conducts them to a tar extractor in the form of a tower 2 in which, by scrubbing and cooling, the heavier hydrocarbons are effectively eliminated. The tar extractor has a combined injector and diffuser 3 which is operated by means of gas under pressure taken from the pressure main 4 through a pipe connection 5. Light tar is supplied to the injector 3 from a tank 6 and a pipe connection 7. The tar enters a nozzle 3$^a$ into which projects another nozzle 5$^a$ communicating with the pipe 5. As the gas issues from the latter under pressure, it atomizes the tar which therefore descends the tower 2 in the form of a spray through which the ascending gases have to pass. The tar spray collects at the bottom of the tower 2 forming a seal 31 through which the gases are forced. The collected tar overflows through a pipe 8 into a pitch basin 9 and flows thence into a collecting tank 10. A tar circulating pump 11 draws its supply from the tank 10 and replenishes the tank 6. The gases, which in the tower 2 are freed from their heavy hydrocarbons, leave the tower by way of slots 2$^a$ which are surrounded by two concentric hoods 12$^a$ and 12$^b$ which dip into tar contained in a pan 2$^b$. From this arrangement it follows that the gases, to pass from the inner into the outer hood, must be forced through the tar in the pan 2$^b$ where impurities are still further retained. From the outer hood the gases are led away through the main 12 and pass through a water cooled condenser 13 and on to a tar eliminator 14 where the lighter varieties of tar vapors which remain in the gas after it has left the cooler, are condensed. The gases are now drawn through an exhauster 15 and forced through the main 4 into a saturater 16 in which they are brought into direct contact with a diluted bath of sulfuric acid. A heat regulator 17 may modify the temperature of the gases before they enter the saturater.

The ammoniacal liquor which has been produced during the cooling process is collected in the tank 10 whence it overflows into a settling tank 18. Here it is separated from the admixture of tar and overflows into a tank 19, the tar freed from liquor being led to a tank 20. In order to recover the ammonia from the liquor collected in the tank 19, the liquor is taken from said tank by a pump 21 and forced through an economizer 22 into a feed tank 23, the conditions being such that the liquid, on arrival in the tank 23 has a temperature of about 230° F. From the tank 23 the liquor passes into a still 24 where it is met by a rising current of hot gases. These gases are taken from the main 4 by a pipe connection 27 and pass through a superheater 26 before they enter the still. In the superheater the gases are brought to a temperature between 212° F. and 750° F. As the hot gases pass through the still they strip the liquor of the ammonia and, laden with the ammonia, they are then returned through a pipe connection 28 to the gas main after passing through a water separator 25. It will be noticed from the diagram that the gas for the still 24 is taken from the main at the pressure side of the exhauster 15 and returned to the main at the opposite side of the exhauster and therefore at a higher pressure than prevails at the place of reentrance. A valve 32 on the main 4 is set so that the required quantity of gas must pass through the pipe 27. Mixed with the main current of the gases from the coke ovens, the ammonia is carried along to the saturater 16. Freed from the ammonia the gases are then passed on through the main 29 to the benzol plant and ovens. The waste liquor from the still 24 is discharged through a pipe 30.

I claim:

1. A process of recovering ammonia from ammoniacal liquor obtained during the purification of coal gas and the like, consisting in passing said liquor through a still, leading off gas from the gas main, passing said gas through a superheater and then through the still for stripping the ammonia from the liquor, returning the ammonia-laden gas to the gas main, and passing it together with the main bulk of gas to a saturater, substantially as and for the purpose set forth.

2. A process for recovering ammonia from ammoniacal liquor obtained during the purification of coal gas and the like, consisting in passing said liquor through a still, leading off gas under pressure from the gas main, passing said gas through a superheater and then through the still for stripping the ammonia from the liquor, returning the ammonia-laden gas to the gas main at a pressure greater than prevails in the main at the place of reëntrance, and passing the ammonia-laden gas together with the main gas bulk to a saturater, substantially as and for the purpose set forth.

3. A process for recovering ammonia from ammoniacal liquor obtained during the purification of coal gas and the like, consisting in passing said liquor through a still, leading off gas from the gas main, heating said gas in a superheater to a temperature between 212° F. and 750° F., forcing the heated gas through the still for stripping the ammonia from the liquor, returning the ammonia-laden gas to the gas main, and passing it together with the bulk of the gas to a saturater, substantially as and for the purpose set forth.

NICHOLAS SCHUSTER.

Witnesses:
 AUG. DANIELSSON,
 H. D. JAMESON.